United States Patent
Ji et al.

(10) Patent No.: US 10,031,302 B2
(45) Date of Patent: Jul. 24, 2018

(54) OPTICAL FIBER CABLE WITH ELONGATE STRENGTH MEMBER RECESSED IN ARMOR LAYER

(71) Applicant: Corning Optical Communications LLC, Hickory, NC (US)

(72) Inventors: Lei Ji, Beijing (CN); Eric Raymond Logan, Hickory, NC (US); Nikolay Anatolyevich Panin, Painted Post, NY (US); Christopher Mark Quinn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/599,849

(22) Filed: May 19, 2017

(65) Prior Publication Data

US 2017/0343752 A1 Nov. 30, 2017

Related U.S. Application Data

(60) Provisional application No. 62/341,983, filed on May 26, 2016.

(51) Int. Cl.
*G02B 6/44* (2006.01)

(52) U.S. Cl.
CPC ......... *G02B 6/4432* (2013.01); *G02B 6/4403* (2013.01); *G02B 6/448* (2013.01); *G02B 6/4486* (2013.01)

(58) Field of Classification Search
CPC .... G02B 6/4432; G02B 6/448; G02B 6/4486; G02B 6/4403; G02B 6/44
See application file for complete search history.

(56) References Cited

U.S. PATENT DOCUMENTS

| 3,397,442 A | 8/1968 | McGean |
| 4,772,089 A | 9/1988 | Ide et al. |

(Continued)

FOREIGN PATENT DOCUMENTS

| CN | 104779012 A | 7/2015 | |
| FR | 2383267 A1 * | 10/1978 | ............. E01C 9/083 |

(Continued)

OTHER PUBLICATIONS

Invitation to Pay Additional Fees; PCT/US17/33446; dated Jul. 28, 2017; 2 Pages; ISA/US Commissioner for Patents.

(Continued)

*Primary Examiner* — Ryan Lepisto
*Assistant Examiner* — Erin Chiem
(74) *Attorney, Agent, or Firm* — William D. Doyle

(57) ABSTRACT

An optical communication cable and related method is provided. The cable includes a cable body and a plurality of optical transmission elements surrounded by the cable body. The cable includes a reinforcement layer surrounding the plurality of optical transmission elements and located between the cable body and the plurality of optical transmission elements. The reinforcement layer includes an outer surface and a channel defined in the outer surface that extends in the longitudinal direction along at least a portion of the length of the cable. The cable includes an elongate strength element extending in the longitudinal direction within the channel.

18 Claims, 11 Drawing Sheets

(56) References Cited

U.S. PATENT DOCUMENTS

| | | | | |
|---|---|---|---|---|
| 4,784,461 A | * | 11/1988 | Abe | G02B 6/4407 |
| | | | | 385/110 |
| 5,029,974 A | | 7/1991 | Nilsson | |
| 5,113,932 A | | 5/1992 | Sakaya et al. | |
| 5,448,670 A | * | 9/1995 | Blew | G02B 6/4422 |
| | | | | 174/70 A |
| 6,304,699 B2 | * | 10/2001 | Field | G02B 6/4433 |
| | | | | 385/100 |
| 6,377,738 B1 | * | 4/2002 | Anderson | G02B 6/4433 |
| | | | | 385/100 |
| 6,392,151 B1 | | 5/2002 | Rafie et al. | |
| 6,665,478 B1 | | 12/2003 | Shen | |
| 8,577,196 B1 | | 11/2013 | McNutt | |
| 8,639,075 B1 | | 1/2014 | Burnett | |
| 9,099,216 B2 | | 8/2015 | Jin et al. | |
| 9,140,867 B1 | | 9/2015 | Aguilar et al. | |
| 9,188,091 B2 | | 11/2015 | Matzen | |
| 2011/0286705 A1 | * | 11/2011 | Blazer | G02B 6/4495 |
| | | | | 385/107 |
| 2014/0373964 A1 | | 12/2014 | Karabelas et al. | |
| 2015/0110451 A1 | | 4/2015 | Blazer et al. | |

FOREIGN PATENT DOCUMENTS

| | | | | | |
|---|---|---|---|---|---|
| GB | 818721 A | * | 8/1959 | | F24D 19/06 |
| JP | 06148476 A | * | 5/1994 | | G02B 6/443 |
| JP | 20120252618 A | | 11/2010 | | |
| JP | 2014075247 A | | 4/2014 | | |
| WO | 0031755 A1 | | 6/2000 | | |

OTHER PUBLICATIONS

International Search Report and Written Opinion of the International Searching Authority; PCT/US17/33446 dated Sep. 28, 2017; 11 Pages; ISA/US Commissioner for Patents.

* cited by examiner

OPTICAL FIBER CABLE WITH ELONGATE STRENGTH MEMBER RECESSED IN ARMOR LAYER

CROSS-REFERENCE TO RELATED APPLICATIONS

This application claims the benefit of priority under 35 U.S.C. § 119 to U.S. Provisional Application No. 62/341,983, filed on May 26, 2016, and is incorporated herein by reference.

BACKGROUND

The disclosure relates generally to optical communication cables and more particularly to optical communication cables including a reinforcing layer including a section, such as a channel, that receives an elongate strength member. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to an optical communication cable including a cable body formed from a polymer material, and the cable body defines a longitudinal direction and a length of the cable. The cable includes a plurality of optical transmission elements surrounded by the cable body. The cable includes a reinforcement layer surrounding the plurality of optical transmission elements. The reinforcement layer is located between the cable body and the plurality of optical transmission elements, and the reinforcement layer includes an outer surface and a channel defined in the outer surface that extends in the longitudinal direction along at least a portion of the length of the cable. The cable includes an elongate strength element extending in the longitudinal direction within the channel.

An additional embodiment of the disclosure relates to an optical communication cable including a cable body. The cable body defines a central bore, a length extending between first and second ends of the cable body and an outer surface defining the outermost surface of the cable. The cable includes at least one optical transmission element located in the central bore. The cable includes an armor layer surrounding the at least one optical transmission element and located in the bore. The armor layer includes a plurality of circumferential peaks extending at least a portion of the distance around the at least one optical transmission element in the circumferential direction and a plurality of circumferential troughs extending at least a portion of the distance around the at least one optical transmission element in the circumferential direction. The circumferential peaks and troughs alternate in a longitudinal direction along the length of the cable. The cable includes an elongate strength element extending along the length of the cable along an outer surface of the armor layer. At least a portion of the elongate strength element is recessed, in the radial direction, below an outermost surface of the plurality of circumferential peaks of the armor layer.

An additional embodiment of the disclosure relates to a method of forming an optical communication cable. The method includes providing a plurality of optical transmission elements. The method includes wrapping a metal sheet around the optical transmission elements. The metal sheet has an outer surface and a longitudinal channel formed in the outer surface of the metal sheet. The method includes positioning an elongate strength member within the longitudinal channel of the metal sheet, the elongate strength member extending the entire length of the longitudinal channel. The method includes extruding a polymer cable body around the metal sheet and around the elongate strength member after positioning the elongate strength member within the longitudinal channel of the metal sheet.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include a plurality of optical transmission elements (e.g., optical fiber ribbons), a reinforcement layer (e.g., a corrugated metal armor layer) surrounding the optical transmission elements and cable body or jacket surrounding the reinforcement layer. The cable also includes one or more elongate strength member or rod (e.g., a wire, glass reinforced plastic rod, etc.) embedded in the cable body located outside of the reinforcement layer. As described in more detail below, the reinforcement layer includes an elongate channel, depression or other recessed structure that extends lengthwise (e.g., in the longitudinal direction) along the outer surface of the reinforcement layer, and the elongate strength member is positioned at least partially within the elongate channel of the reinforcement layer.

In various embodiments, by recessing the elongate strength members into the reinforcement layer, the diameter measured at the radially outer surfaces of the strength members can be reduced, which in turn reduces the variation in jacket thickness that typically occurs at the strength member location. Further, the cable design discussed herein may provide for improved mechanical or frictional coupling between the reinforcement layer and the elongate strength members. Thus, in contrast to typical conventional cable designs in which a strength rod is located entirely external to the armor layer, the design discussed herein is believed to improve various cable performance characteristics, such as bend performance, jacket integrity and robustness of the reinforcement layer and may also reduce the total jacket thickness and the amount of polymer needed to form the jacket. In specific embodiments, the reduction in jacket thickness may result in a lighter cable.

Figure 1:
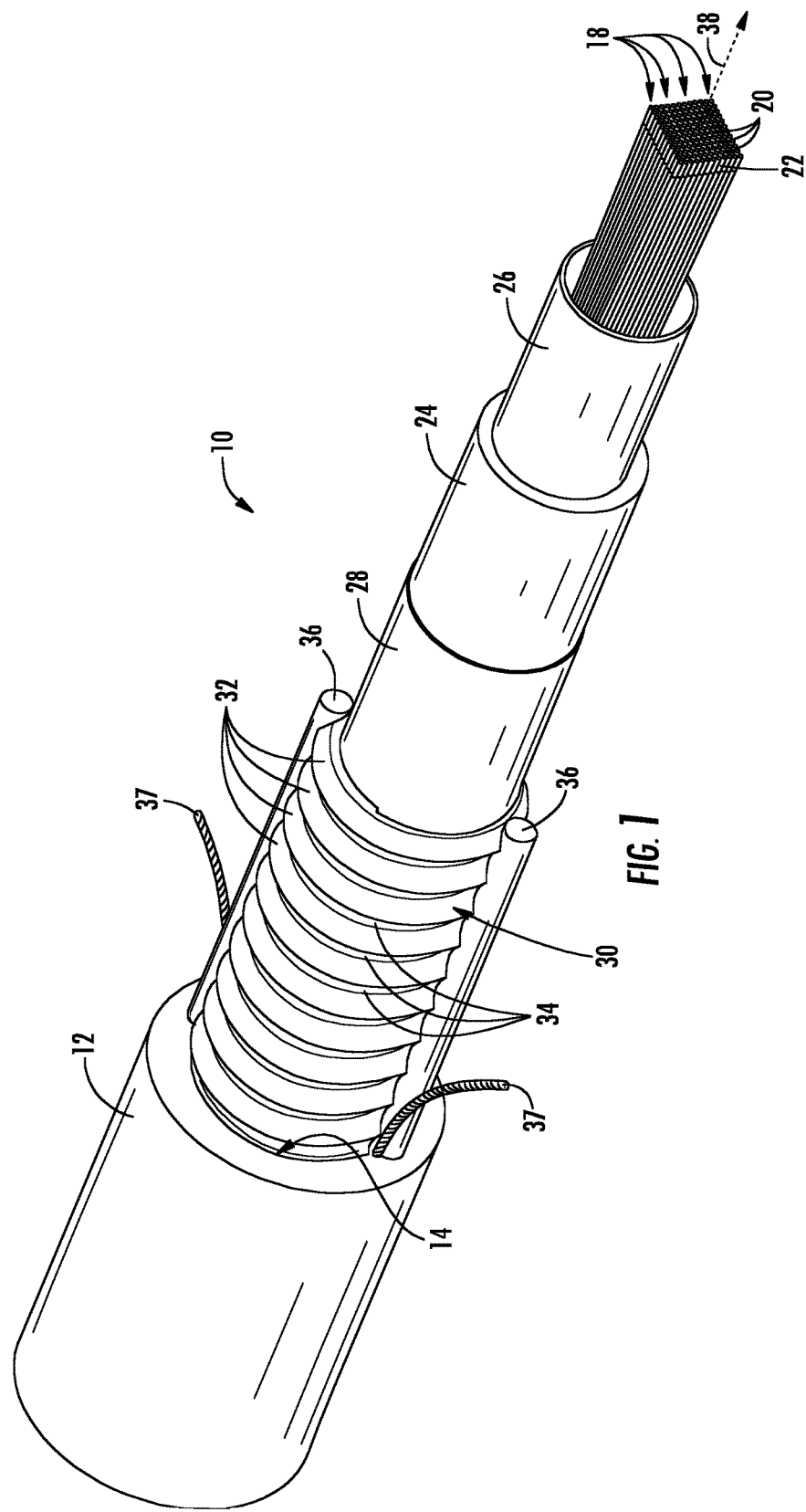
FIG. 1 is a perspective view of an optical communication cable, according to an exemplary embodiment.
Figure 2:
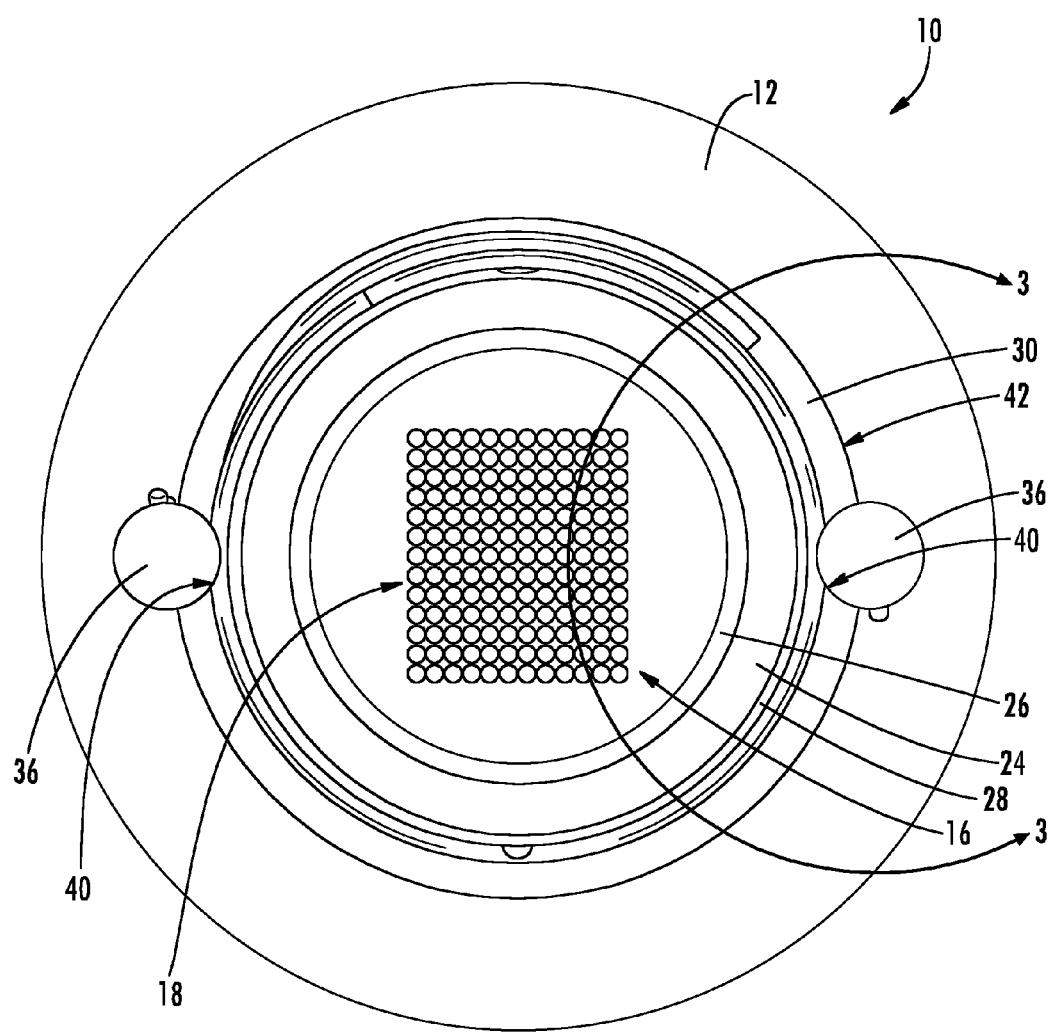
FIG. 2 is an axial cross-sectional view of the cable of FIG. 1, according to an exemplary embodiment.

Referring to FIGS. 1 and 2, an optical communication cable, such as cable 10, is shown according to an exemplary embodiment. Cable 10 includes a cable body, shown as cable jacket 12, having an inner surface 14 that defines a bore, shown as central bore 16. In various embodiments, cable jacket 12 may be made from a variety of suitable polymer materials, such as extrudable polymer materials, including medium density polyethylene materials. One or more optical transmission elements, shown as optical fiber ribbons 18, are located within central bore 16. In general, optical fiber ribbons 18 each include a plurality of optical fibers 20 (e.g., at least 2, at least 4, at least 8, at least 12 optical fibers, etc.) supported by a polymeric ribbon matrix 22, which may be any suitable polymer material, such as a UV curable polymer material. Generally, cable 10 provides structure and protection to optical fiber ribbons 18 during and after installation (e.g., protection during handling, protection from elements, protection from vermin, etc.).

In the embodiment shown in FIGS. 1 and 2, bundles of optical fiber ribbons 18 are located within a buffer tube 24 which is also located in central bore 16 surrounded by cable jacket 12. In various embodiments, cable 10 includes one or more layer of a water blocking or absorbing material, show as water blocking tape layers 26 and 28. In the embodiment shown, water blocking tape layer 26 is located on the inside of buffer tube 24, and water blocking tape layer 28 is located on the outside of buffer tube 24.

Cable 10 includes a reinforcement sheet or layer, shown as armor layer 30, which is located within central bore 16, outside of water barrier 28 and surrounded by cable jacket 12. Armor layer 30 is wrapped around the interior elements (including optical fiber ribbons 18) of cable 10 such that armor layer 30 surrounds optical fiber ribbons 18 within bore 16. Armor layer 30 generally extends all or substantially all of the axial length of cable 10. Armor layer 30 generally provides an additional layer of protection to optical fibers 20 of optical fiber ribbons 18 within cable 10, and may provide resistance against damage (e.g., damage caused by contact or compression during installation, damage from the elements, damage from rodents, etc.). In specific embodiments, armor layer 30 is formed from a sheet of material having a width sufficient so that armor layer 30 completely surrounds the cable components within the armor layer. In various embodiments, armor layer 30 may be formed from a sheet material having a width between 0.5 inches and 4 inches.

In the embodiment shown, armor layer 30 is wrapped, bent, molded or otherwise shaped to include a plurality of alternating peaks 32 and troughs 34. Both peaks 32 and troughs 34 extend in the circumferential direction at least a portion of the distance around armor layer 30. Cable 10 also includes one or more elongate strength element, shown as strength rods 36, that extend in the longitudinal direction within central bore 16 within cable jacket 12, and generally provide increased tensile strength to cable 10. As shown, strength rods 36 are at least partially embedded in cable jacket 12 and are located adjacent to armor layer 30. Further, in the embodiment shown, peaks 32 and troughs 34 extend in the circumferential direction substantially the entire distance between opposing rods 36. Cable 10 also includes rip cords 37 embedded in cable jacket 12 adjacent strength elements 36.

As shown in FIGS. 1-4B, cable 10 includes at least one longitudinally extending channel, recess or depression, shown as channels 40, that are defined in the outer surface 42 of armor layer 30. Rods 36 are positioned such that at least a portion of rods 36 reside in channels 40 and extend longitudinally within channels 40. In the particular embodiments shown, cable 10 includes two channels 40 each receiving one rod 36, and the two channels 40 are spaced at least 90 degrees from each other and more specifically are about 180 degrees from each other (e.g., such that the circumferential center points of channels 40 are spaced 180 degrees plus or minus 10 degrees from each other).

In some such embodiments, cable 10 includes two channels 40 and two rods 36. However, in other embodiments, cable 10 includes a variety of different strength rod arrangements, and in a particular embodiment, cable 10 includes four strength rods 36. In some such embodiments, cable 10 may include four channels 40, and in other embodiments, cable 10 may include two strength rods 36 in two channels 40.

Further, in particular embodiments, both rods 36 and channels 40 extend the entire length of armor layer 30, of cable 10 and/or of cable jacket 12 between opposing first and second ends of the armor layer 30, cable 10 and/or cable jacket 12. In embodiments having channels 40 that extend the entire length of cable 10, channels 40 are recessed, in the radial direction, below all of peaks 32 along the length of cable 10. Further, channels 40 and rods 36 are substantially parallel to longitudinal axis 38 (at least when cable 10 is straightened), and in this arrangement, rods 36 are unwrapped relative to armor layer 30 and/or relative to longitudinal axis 38 such that the length of rods 36 is substantially the same as the length of cable 10 and/or the length of armor layer 30 (e.g., within plus or minus 5%, within plus or minus 0.1%, or within plus or minus 0.01%).

In general, by incorporating longitudinal channels 40 into armor layer 30 such that rods 36 are recessed at least part of the radial distance into armor layer 30, the diameter of cable 10 and the thickness of cable jacket 12 can be reduced while at the same time maintaining a generally circular outer perimeter of cable 10. Thus, it is believed that the design of armor layer 30 discussed herein allows for formation of a cable that is lighter, has a smaller outer diameter and is more flexible, while maintaining strength of the armor layer, than conventional cable designs in which strength rods are not recessed within armor layer 30.

Figure 3:
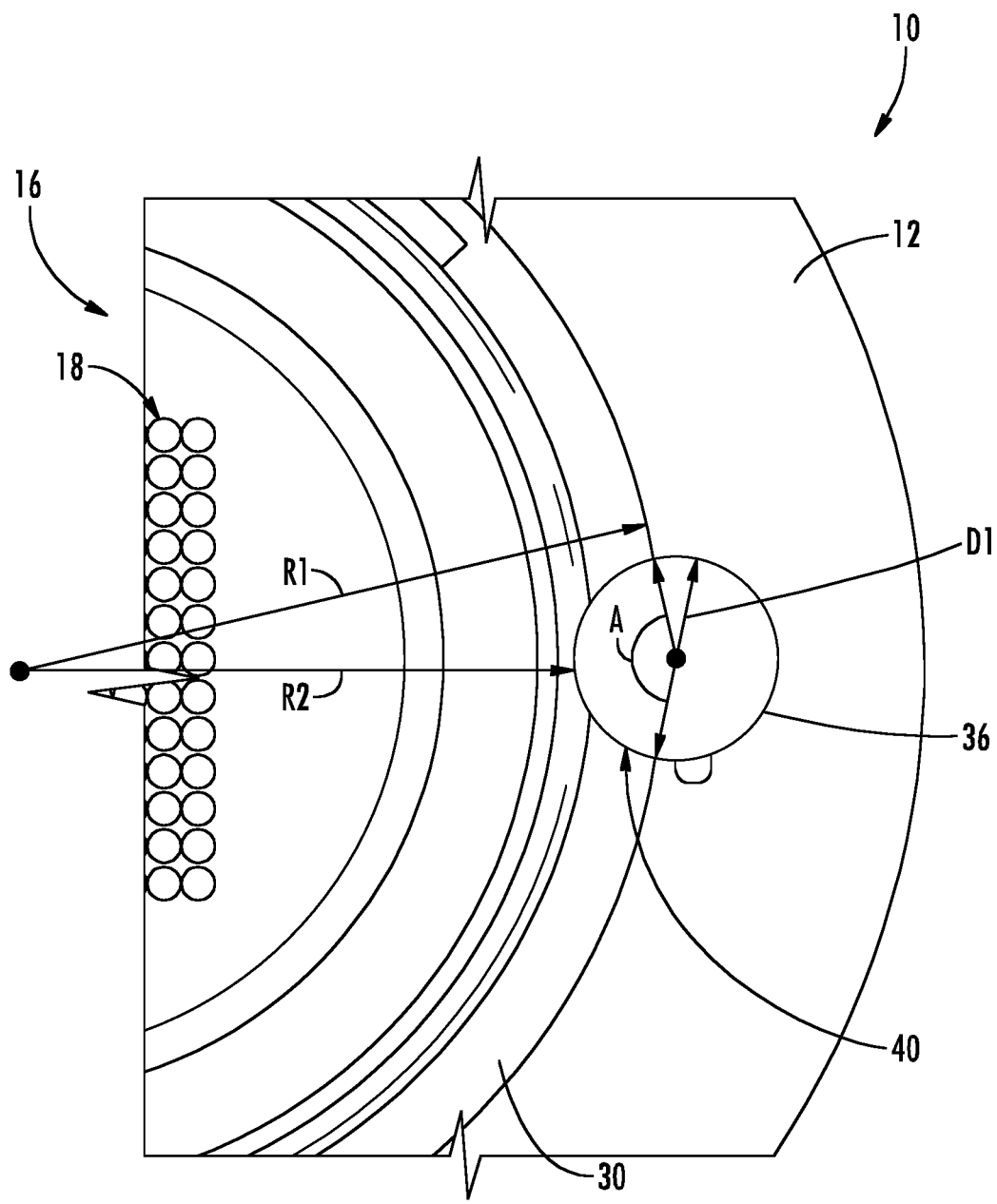
FIG. 3 is a detailed axial cross-sectional view of a portion of the cable of FIG. 1, according to an exemplary embodiment.

Referring to FIG. 3, a detailed view of channel 40 and rod 36 are shown. As shown, armor layer 30 has a maximum outer radius, R1, at a position outside of channel 40, and in the particular embodiment shown, R1 is the outer radius of armor layer 30 taken at a longitudinal position through one of the peaks 32. Further, armor layer has a channel radius, R2, at the radial innermost portion of the outer surface of armor layer 30 within channel 40. As can be seen in FIG. 3, the difference between R1 and R2 defines a channel depth, and where R1 is the radius at a cross-sectional position taken through peaks 32, the difference between R1 and R2 defines a maximum channel depth. In various embodiments, the difference between R1 and R2 is between 0.3 mm and 0.8 mm, specifically between 0.5 and 0.6 mm and more specifically, between 0.54 mm and 0.56 mm.

Further, rods 36 and channel 40 are sized such that degree to which rods 36 are recessed into armor layer 30 may facilitate lower jacket thickness and bend performance. In various embodiments, rod 36 includes a width, shown as diameter D1. In various embodiments, D1 is at least 25% of the maximum channel depth, specifically is at least 35% of the maximum channel depth (e.g., R1 minus R2) and more specifically is at least 45% of the maximum channel depth. In particular embodiments, D1 is between 0.1 mm and 10 mm, specifically between 1 mm and 3 mm, and more specifically is as low as 1.1 mm and as large as 2.5 mm. In a specific embodiment, D1 is 1.5 mm.

As shown in FIG. 3, the portions of armor layer 30 defining channel 40 at least partially surrounds the outer surface of rods 36, and in some embodiments, the outer surface of rods 36 may be in contact with at least a portion of channel 40. In various embodiments, the portion of armor layer 30 surrounding the outer surface of rods 36 has an angular length in the circumferential direction around rods 36, shown as angle A, of at least 5 degrees and specifically at least 30 degrees and less than 180 degrees. Applicant believes that both the degree to which rod 36 is recessed into armor 30 and the degree to which channel 40 surrounds rod 36 relate to the jacket and strengthening performance of cable 10. In specific embodiments, a glue material may bond together rod 36 and armor 30, and in such embodiments, the glue material may completely or partially limit direct contact between armor 30 and rod 36.

It should be understood that, while FIGS. 2 and 3 show a single cross-sectional view taken through one of peaks 32, cable 10 is structured such that multiple locations along the length of cable 10 have the same or similar cross-section as discussed herein. In specific embodiments, cable 10 is structured such that at least half of the cross-sections taken through peaks 32 have the same or similar cross-section as shown in FIGS. 2 and 3, and specifically all of the cross-sections taken through peaks 32 have the same or similar cross-section as shown in FIGS. 2 and 3. In specific embodiments, cable 10 is structured such that cross-sections taken through at least 10 consecutive peaks 32 have the same or similar cross-section as shown in FIGS. 2 and 3.

In various embodiments, armor layer 30 may be formed from a variety of strengthening or damage resistant materials, and generally is formed from a material that is different from the polymer material of cable jacket 12. In the embodiment shown in FIG. 1, armor layer 30 is formed from a corrugated sheet of metal material having an alternating series of peaks 32 and troughs 34. In various embodiments, the corrugated metal is steel or aluminum, and in specific embodiments, the steel or aluminum material has a thin non-metallic (e.g., polymer) outer coating layer. In various embodiments, armor layer 30 is a thin metal material having a thickness between 0.1 mm and 0.2 mm, and more specifically between 0.14 mm and 0.17 mm. In other embodiments, other non-metallic strengthening materials may be used. For example, armor layer 30 may be formed from fiberglass yarns (e.g., coated fiberglass yarns, rovings, etc.). In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.).

Figure 4A:
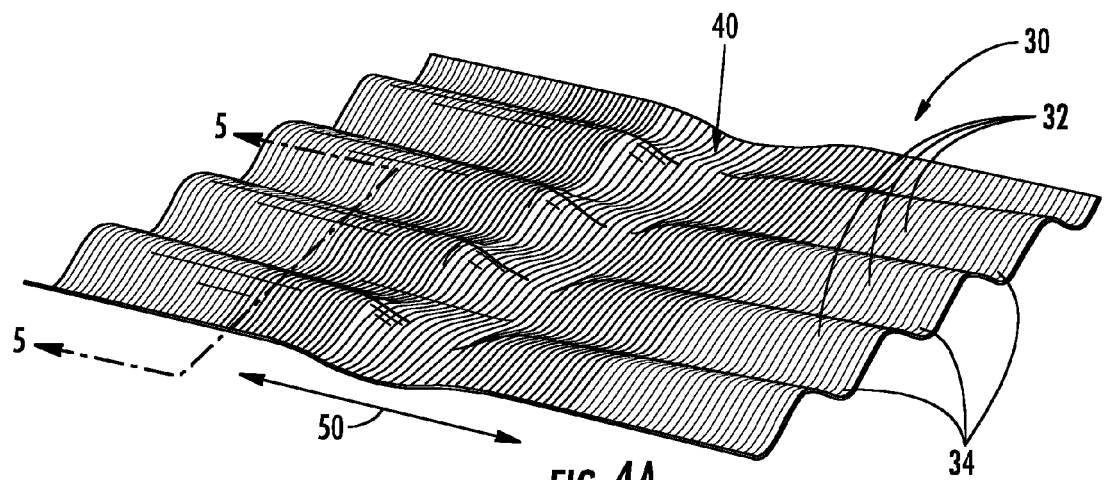
FIGS. 4A and 4B are detailed perspective views of a section of an armor layer showing a longitudinal channel, according to an exemplary embodiment.
Figure 4B:
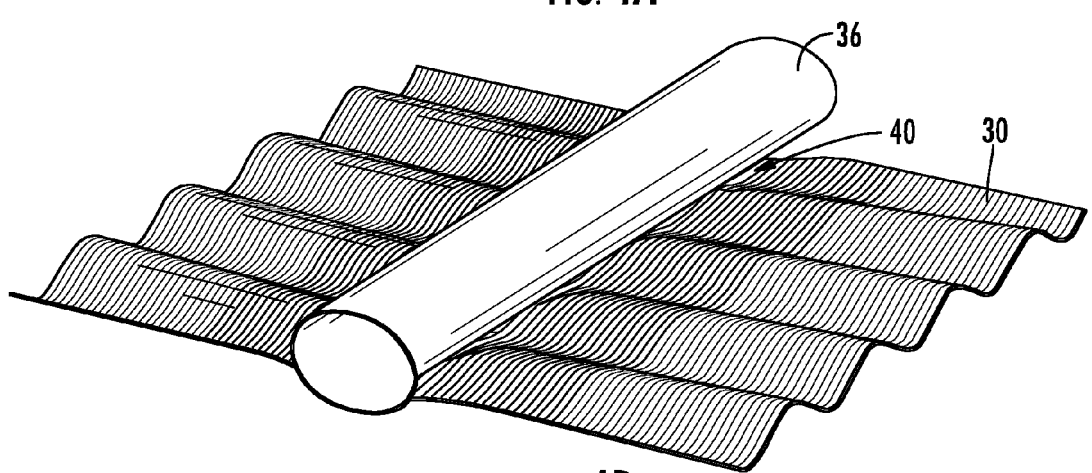

Referring to FIGS. 4A and 4B, detailed views of a section of armor layer 30 including one of the channels 40 are shown. It should be understood that both channels 40 armor layer 30 are formed as the channel shown in detail in FIG. 4A. 4A shows armor layer with strength rod 36 removed, and FIG. 4B shows a strength rod 36 located in channel 40. As shown in FIGS. 4A and 4B, both channel 40 and rod 36 extending in the longitudinal direction traversing at least two peaks 32 and two troughs 34. In specific embodiments, the arrangement shown in FIGS. 4A and 4B is repeated along the length of cable 10 such that both channel 40 and rod 36 extend in the longitudinal direction traversing at least five peaks 32 and five troughs 34, at least 10 peaks 32 and five troughs 34, at least 100 peaks 32 and 100 troughs 34, etc. In particular embodiments, the peaks and troughs traversed by channel 40 and rod 36 are contiguous, adjacent peaks 32 and troughs 34 along the length of cable 10.

In the channel structure shown in FIGS. 4A and 4B, channel 40 is a noncorrugated rounded or curved channel that extends lengthwise and substantially perpendicular to the circumferential direction (represented by arrow 50). In such embodiments, at least a portion of channel 40 is defined by a portion of the outer surface of armor layer 30 that is concave. Referring to FIGS. 3 and 4B, in various arrangements, the smaller radius R2 defined at the lowest point of channel 40 (shown in FIG. 3) extends lengthwise and remains recessed below the outermost points of peaks 32 for a substantial section of armor layer 30. In various embodiments, R2 remains less than R1 for at least a 10 cm lengthwise section of armor layer 30. In other embodiments, R2 remains less than R1 for at least 10 consecutive peaks 32, at least 100 consecutive peaks 32, at least 1000 consecutive peaks 32, etc. In various embodiments, channel 40 may have a variety of curved or non-curved cross-sectional shapes in a plane perpendicular to longitudinal axis 38, including semi-circular, semi-elliptical, angled, v-shaped and/or flat.

Figure 5:
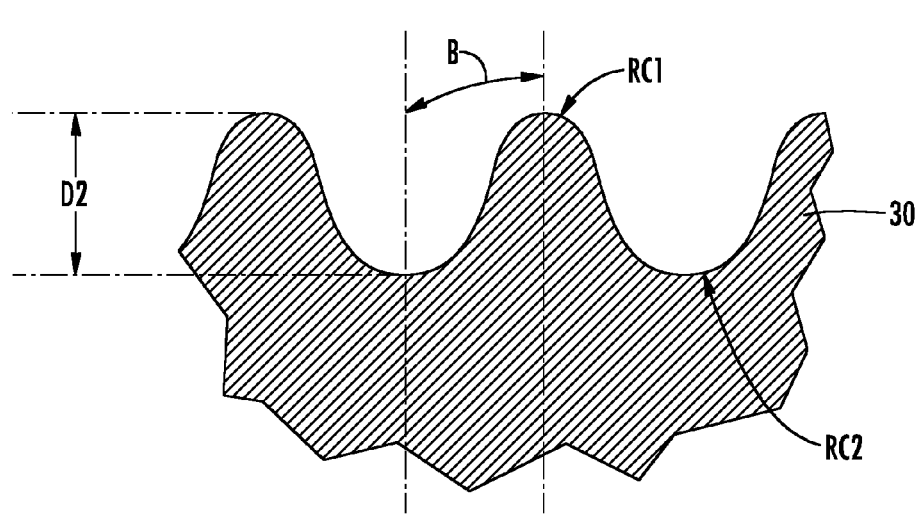
FIG. 5 is a longitudinal cross-sectional view of a portion of the armor layer shown in FIG. 4A, according to an exemplary embodiment.

Referring to FIG. 5, a detailed view of peaks 32 and troughs 34 is shown in cross-section taken in the longitudinal direction (e.g., parallel to longitudinal axis 38). Applicant has found that, in some embodiments, bending performance of armor layer 30 may be improved by shaping peaks 32 and troughs 34 in a manner that limits stress concentrations at the transitions between both the peaks 32 and troughs 34 and channel 40. As shown in FIG. 5, the outer most surfaces of peaks 32 have a radius of curvature in the longitudinal direction, RC1, the lower most surfaces of troughs 34 have a radius of curvature in the longitudinal direction, RC2, peaks 32 and troughs 34 have an angular spacing shown as angle B, and a corrugation depth shown as D2.

In various embodiments, RC1 is between 0.30 mm and 0.60 mm, specifically is between 0.40 mm and 0.50 mm, and more specifically is between 0.44 and 0.46 mm. In various embodiments, RC2 is between 0.55 mm and 0.85 mm, specifically is between 0.60 mm and 0.70 mm, and more specifically is between 0.63 and 0.70 mm. In a specific embodiment, RC2 is between 0.63 mm and 0.65 mm. In various embodiments, angle B is between 2 degrees and 3 degrees, specifically 2 degrees and 2.5 degrees, and more specifically is between 2.15 degrees and 2.2 degrees. D2 is between 0.60 mm and 0.80 mm, specifically is between 0.65 mm and 0.75 mm, and more specifically is between 0.69 and 0.71 mm.

In various embodiments, Applicant believes that angle B, RC1 and/or RC2 are generally larger than the corresponding dimensions of a conventional armor layer without channels 40, which in turn lowers the number of peaks 32 per inch of armor length in armor layer 30 as compared to conventional armor. Further, Applicant believes that this alternation in design provides for better strain performance within the armor, particularly at the transition from peaks 32 into channels 40, as compared to a design in which channels 40 were added to a cable armor layer having a conventional corrugation pattern. While there may be a number of design parameters of armor layer 30 that can be altered to lower strain within the corrugations of an armor layer including channels 40, Applicant has found that increasing RC1, increasing RC2 and/or increasing angle B are particularly effective design parameters that may be adjusted to reduce corrugation strain while still providing good flexural performance.

Figures 6A, 6B:
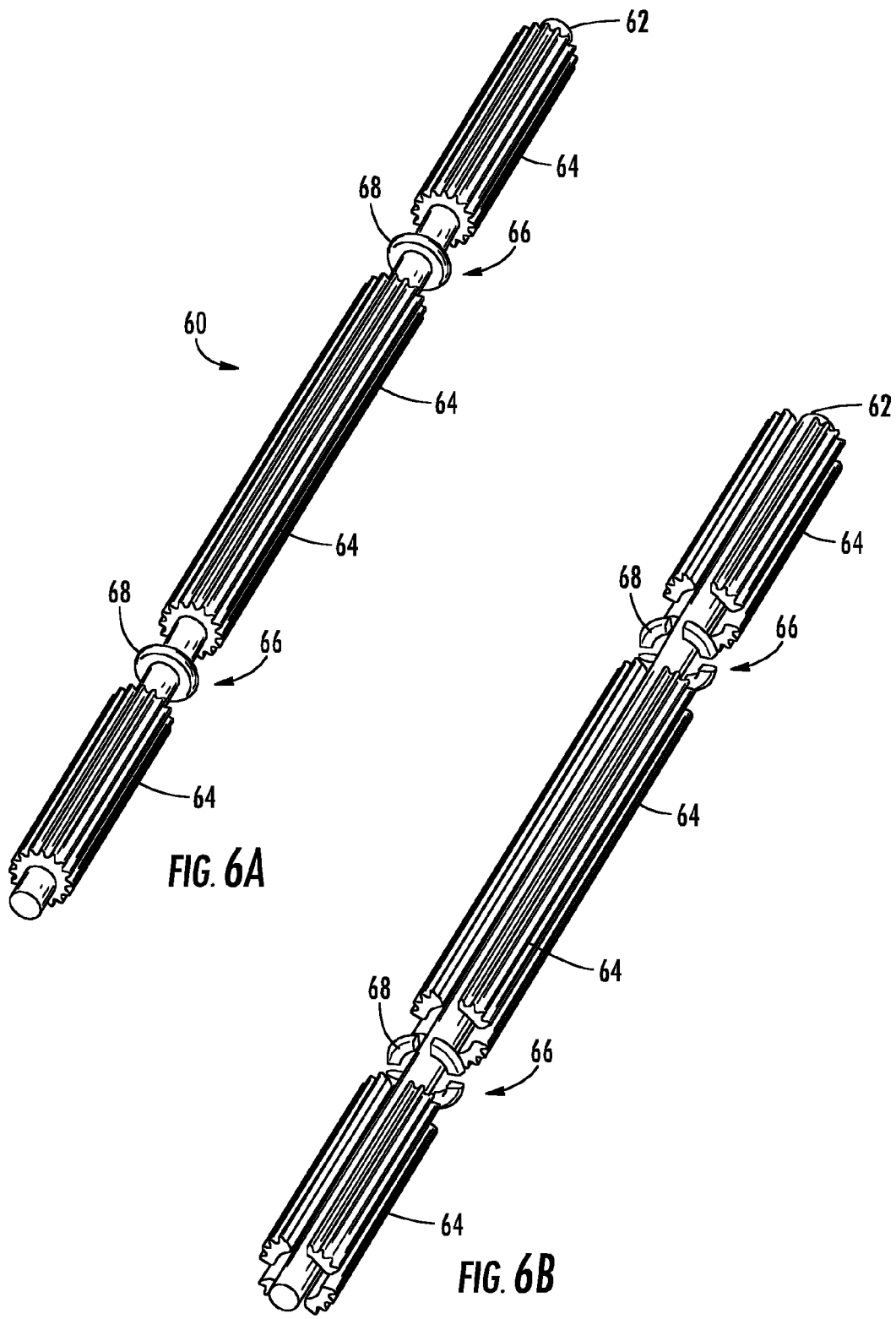
FIGS. 6A and 6B are perspective views of a tool for forming an armor layer, according to an exemplary embodiment.
Figure 7:
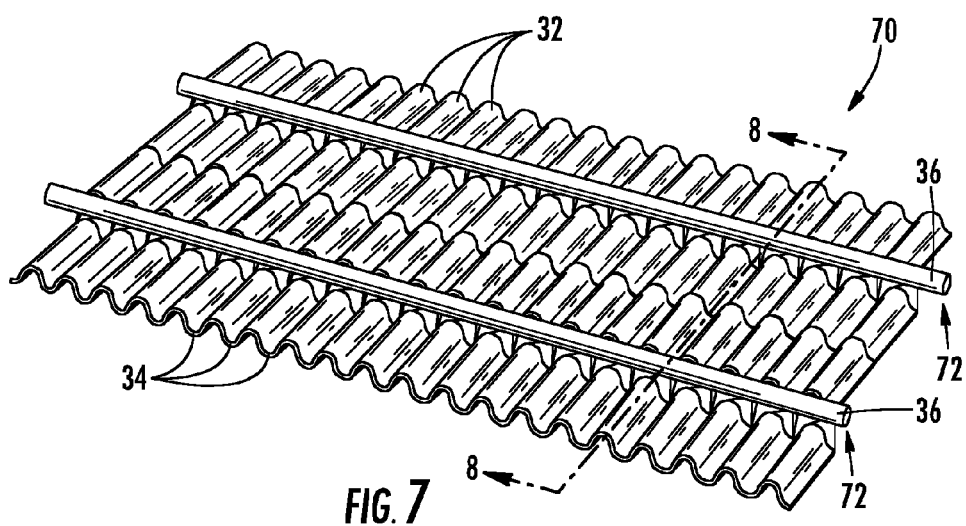
FIG. 7 is a perspective view of an armor layer for an optical cable, according to another exemplary embodiment.

Referring to FIG. 6A, a tool, such as roller 60, for forming armor layer 30 is shown according to an exemplary embodiment. Roller 60 includes a shaft 62, corrugation rollers 64, non-corrugated central sections 66 and central press rollers 68. In general, roller 60 is configured to rotate and press form a flat piece of material into armor layer 30 having peaks 32, troughs 34 and channels 40. In this arrangement, corrugation rollers 64 are shaped to form peaks 32 and troughs 34, and central press rollers 68 are shaped to form channel 40. In specific embodiments, as shown in FIG. 6B, corrugation rollers 64 may be formed from multiple pieces (e.g., four pieces) that are coupled for example via a keyed arrangement to shaft 62.

Referring to FIGS. 7-16, in various embodiments, the reinforcement or armor layer discussed herein may be corrugated in a pattern in which the peaks and/or troughs of the corrugation pattern extend circumferentially across at least a portion of the channels. In such embodiments, the height (e.g., the outer radius) of the peaks within the channel are less than the height of the peaks outside of the channel such that the strength elements are recessed at least part of the way into the armor layer.

Figure 8:
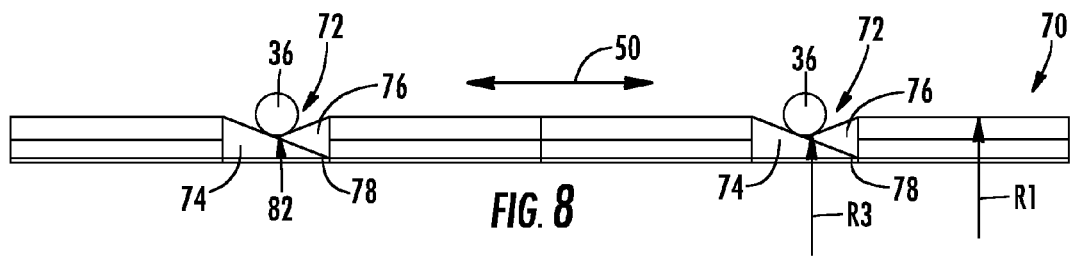
FIG. 8 is an axial cross-sectional view of the armor layer of FIG. 7, according to an exemplary embodiment.
Figure 9:
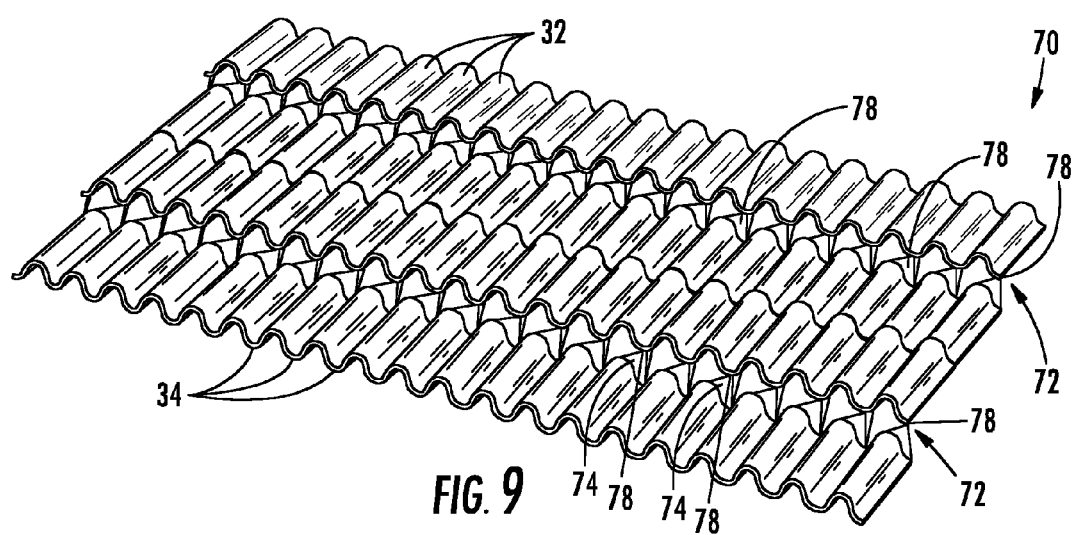
FIG. 9 is a perspective view from above of the armor layer of FIG. 7 with the strength rods removed, according to an exemplary embodiment.
Figure 10:
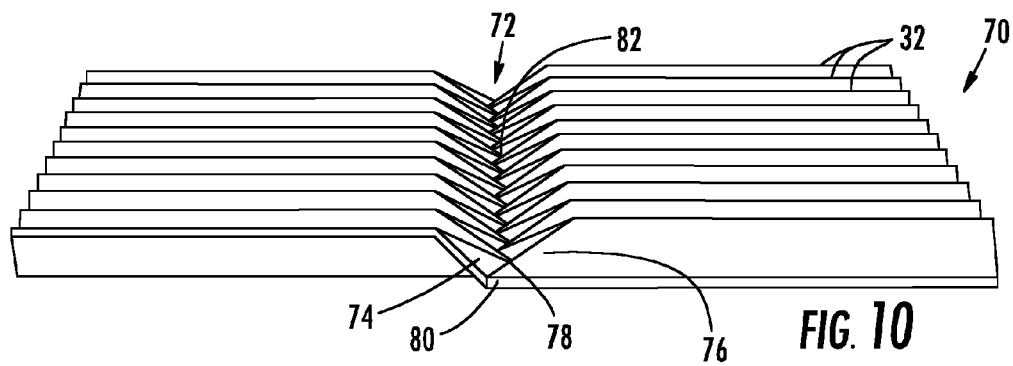
FIG. 10 is a detailed perspective view from above of one of the channels of the armor layer of FIG. 9, according to an exemplary embodiment.
Figure 12A:
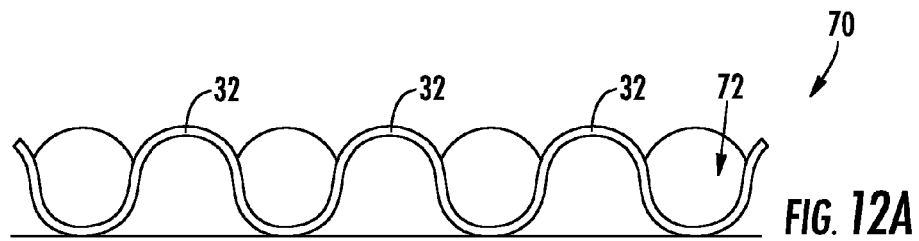
FIGS. 12A-12E are longitudinal cross-sectional views of the armor layer shown in FIG. 9, taken at sequential positions across the channel in the circumferential direction, according to an exemplary embodiment.
Figure 12B:
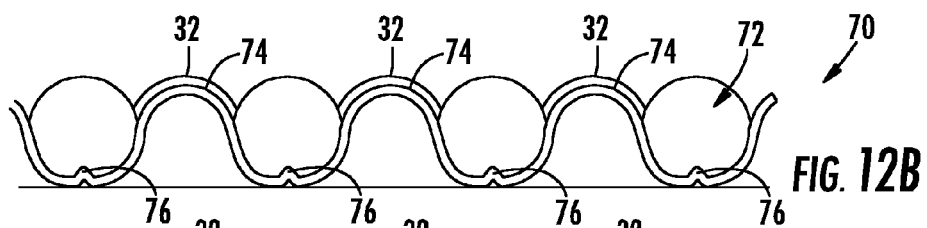
Figure 12C:
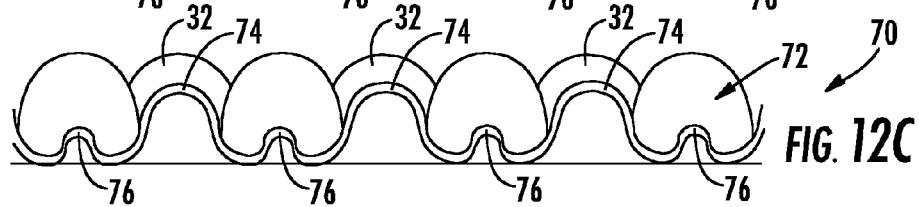
Figure 12D:
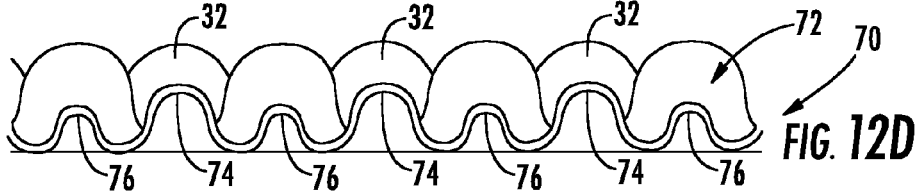
Figure 12E:
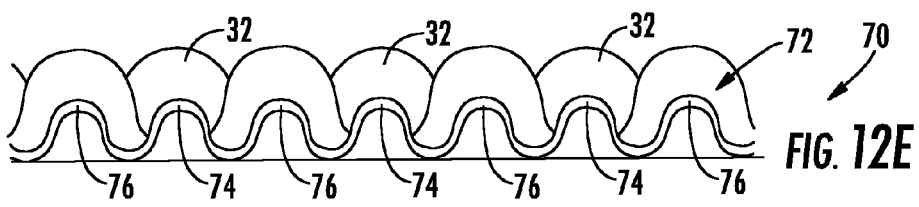
Figure 13:
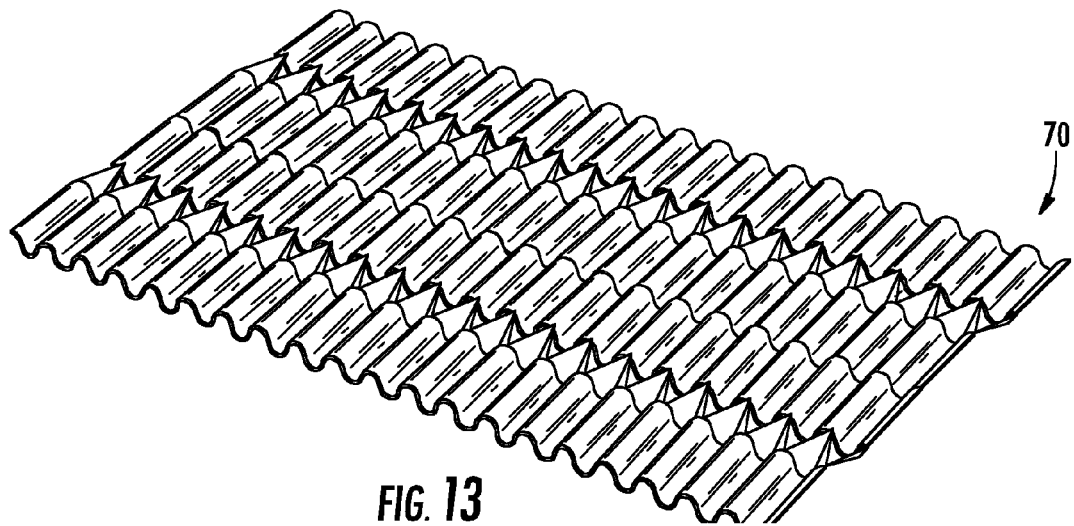
FIG. 13 is a perspective view from below of the armor layer of FIG. 7, according to an exemplary embodiment.
Figure 14:
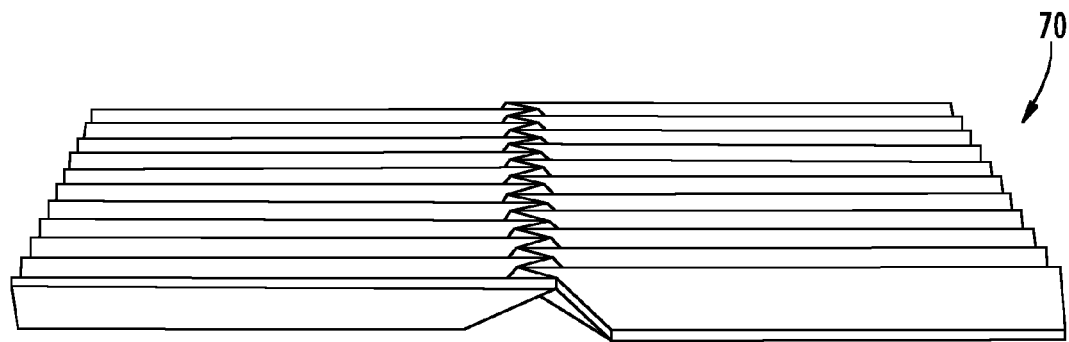
FIG. 14 is a detailed perspective view from below of one of the channels of the armor layer shown in FIG. 13, according to an exemplary embodiment.

Referring to FIGS. 7-14, a reinforcement layer, shown as armor layer 70, is shown according to an exemplary embodiment. Armor layer 70 is substantially the same as armor layer 30, except for the differences discussed herein. It should be understood that FIGS. 7-11, 13 and 14 show armor layer 70 in the flat configuration (e.g., prior to wrapping around optical ribbons 18) to better shown the structures discussed herein, and, similarly. FIGS. 10 and 14 show armor layer 70.

Figure 11:
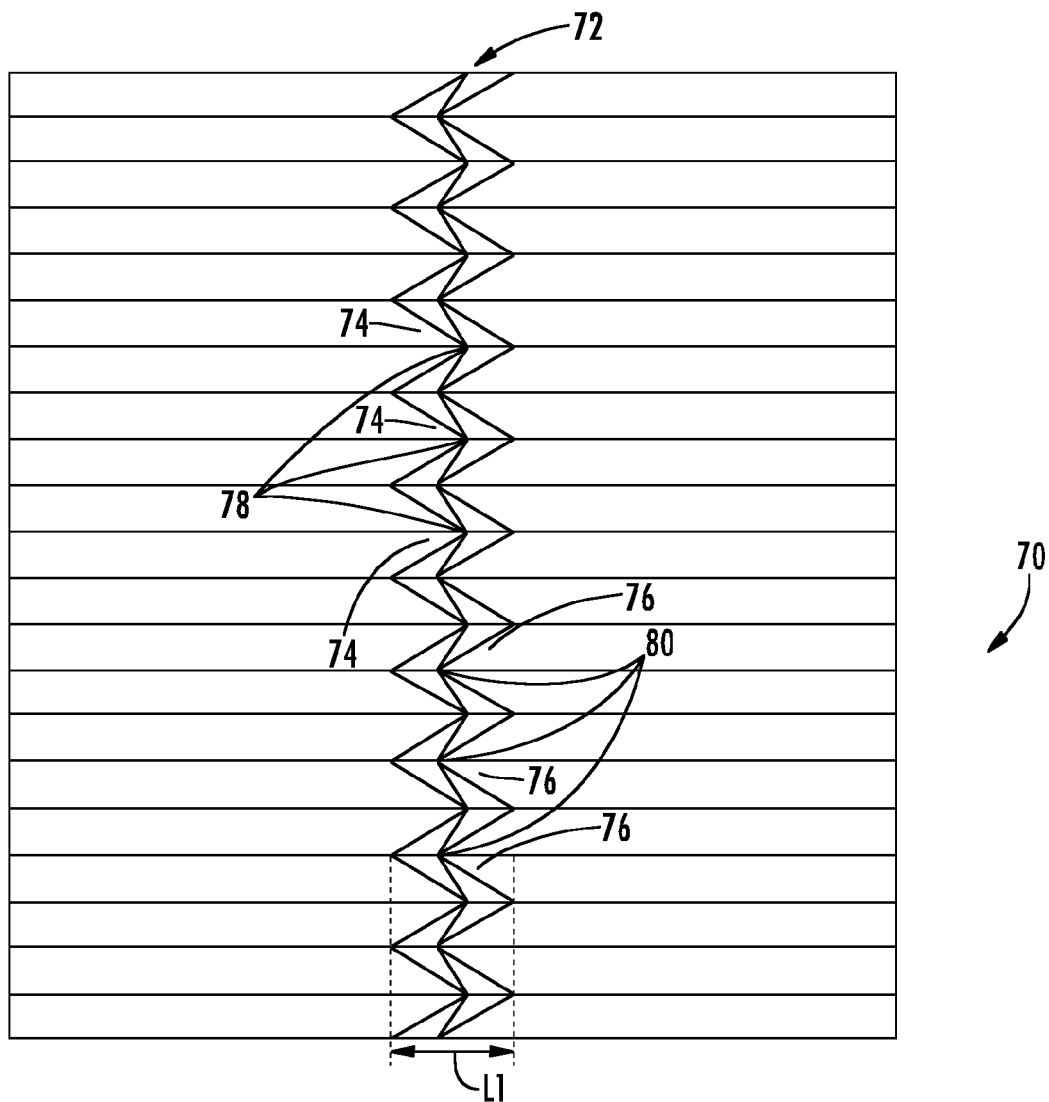
FIG. 11 is top plan view of the channel of the armor layer shown in FIG. 10, according to an exemplary embodiment.

FIGS. 7-11 show the outer surface of armor layer 70, and FIGS. 13 and 14 show the inner surface of armor layer 70. Armor layer 70 includes longitudinal channels 72 that receive strength rods 36. Unlike armor 30, peaks 32 of armor layer 70 include peak sections 74 and 76 that extend at least a portion of the distance in the circumferential direction into channels 72. Applicant believes that at least in some designs, the overlapping or interleaving of peak sections 74 and 76 may lower corrugation strain experienced within armor layer 70 (as compared armor layer 30 including channel 40). It should be understood that while FIGS. 10, 11 and 14 show a portion of armor layer 70 having a single channel 72, both channels 72 of armor layer 70 may be configured as shown in FIGS. 10, 11 and 14.

As shown best in FIGS. 9-11, peak sections 74 extend into channel from the left (in the orientation of FIGS. 7-14) and peak sections 76 into channel 72 from the right (in the orientation of FIGS. 7-14). Peak sections 74 and 76 are positioned such that they alternate with each other along the longitudinal length of armor layer 70. Further, both peak sections 74 and 76 decrease in height (e.g., the outer radius of peak sections 74 and 76 decrease) toward the center of channel 72 such that peak sections 74 taper to a point 78 and peak sections 76 taper to a point 80.

As shown in FIGS. 9-11, peak sections 74 and 76 each have a circumferential length that is greater than one half of the circumferential channel length L1 shown in FIG. 11 which results in peak sections 74 and 76 overlapping each other in the circumferential direction. This circumferential overlap is shown best in FIGS. 8, 10 and 11 and defines the bottom 82 of channels 72 which is formed from portions of the outer surfaces of peak sections 74 and 76 located generally at the center of channels 72 where the peak sections 74 and 76 extend past each other in the circumferential direction. In various embodiments, L1 is larger than the diameter of rods 36.

As shown best in FIG. 8, the tapered shape and staggered positioning of peak sections 74 and 76 define channel bottom 82 which is recessed below the portion of peaks 32 located outside of channels 72 in the circumferential direction. Thus, when rods 36 are positioned within channels 72 they are supported by channel bottom 82 such that at least a portion of strength rods 36 are recessed below the outer most surfaces of peaks 32 outside of channels 72. As shown in FIG. 8, when armor layer is wrapped around ribbons 18, channel bottom 82 has an outer radius shown as R3 which is less than the outer radius R1 of peaks 32 outside of channels 72 resulting in the recess of rods 36 shown in FIG. 8.

FIGS. 12A-12E show a series of longitudinal cross-sectional views taken through armor layer 70 at sequential circumferential positions moving from left to right through channel 72, in the orientation shown in FIG. 11. FIG. 12A shows peaks 32 of armor layer 30 to the left of channel 72 before peak sections 74 begin to taper toward the center of channel 72. FIG. 12B shows the start of the taper of peak sections 74 toward the left edge of channel 72 and also shows the end of the taper of peak sections 76 (which is near tips 80) toward the left edge of channel 72. Moving closer toward the center of channel 72 from left to right, FIG. 12C shows peak sections 74 further decreasing in height and peak sections 76 increasing in height. FIG. 12D, moving yet closer to the center of channel 72, shows the height of peak sections 74 decreased further and the height of peak sections 76 increased such that heights of peak sections 74 and 76 are approaching each other toward the center of channel 72. As shown in FIG. 12E, once the center of channel 72 is crossed moving from left to right, the height of peak sections 76 are greater than the height of peak sections 74. Further, peak sections 76 gradually increase in height to meet peaks 32 on the right side of channel 72 while peak sections 74 continue to decrease in height, forming points 78 adjacent the right side of channel 72.

Referring to FIGS. 13 and 14, the inner surface of armor layer 70 (i.e., the surface of armor layer 70 that faces optical ribbons 18 in cable 10) is shown. As shown in FIGS. 13 and 14, when armor layer 70 is formed or shaped from a sheet of metal material, peaks 32, troughs 34, peak sections 74 and peak sections 76 are visible along the lower surface of armor layer 70. Thus, because these structures are formed from bending a sheet of material, the shape of the lower surface generally reflects the shape of the upper surface.

Figure 15:
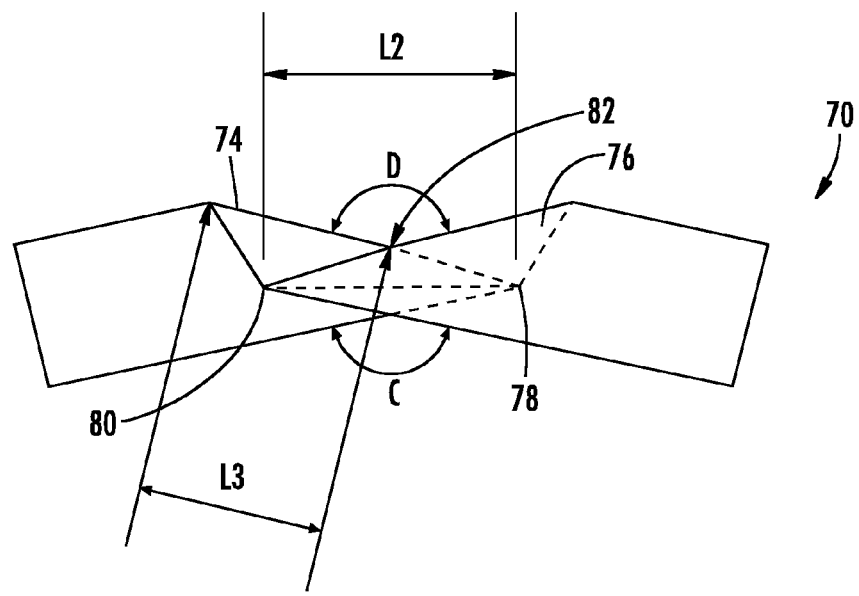
FIG. 15 is a detailed axial cross-section view of one of the channels of the armor layer shown FIG. 9, according to an exemplary embodiment.

Referring to FIG. 15, a detailed view of channel 72 is shown according to an exemplary embodiment. In the embodiment shown, the lower surface of armor layer 70 at channel 72 forms angle C centered around the circumferential center line of channel 72. In specific embodiments, angle C is less than 180 degrees and may be shaped to provide a portion of the curvature that allows armor layer 70 to wrap around the optical transmission elements (e.g., optical fiber ribbons 18) of cable 10.

Further, peak sections 74 and 76 define an angle D which is the angle between the radial outer most surfaces of peak sections 74 and 76. Angle D is also less than 180 degrees and is related to the steepness of the taper of peak sections 74 and 76. In addition, peak sections 74 and 76 define an overlap length L2 which is the circumferential length between points 78 and 80 of adjacent peak sections 74 and 76, respectively. Peak section 74 also defines a length L3 which is the linear length of the outer surface of peak section 74 from the start of the taper of peak section 74 to the channel bottom 82 located generally at the center of channel 72. As will be understood, while not labeled in FIG. 15, peak sections 76 are also generally defined by a length L3 which is the linear length of the outer surface of peak section 76 from the start of the taper of peak section 76 to the channel bottom 82 located generally at the center of channel 72. In general, angle D, lengths L2 and L3 are selected based on various cable design parameters, including cable diameter and strength element width.

Figure 16:
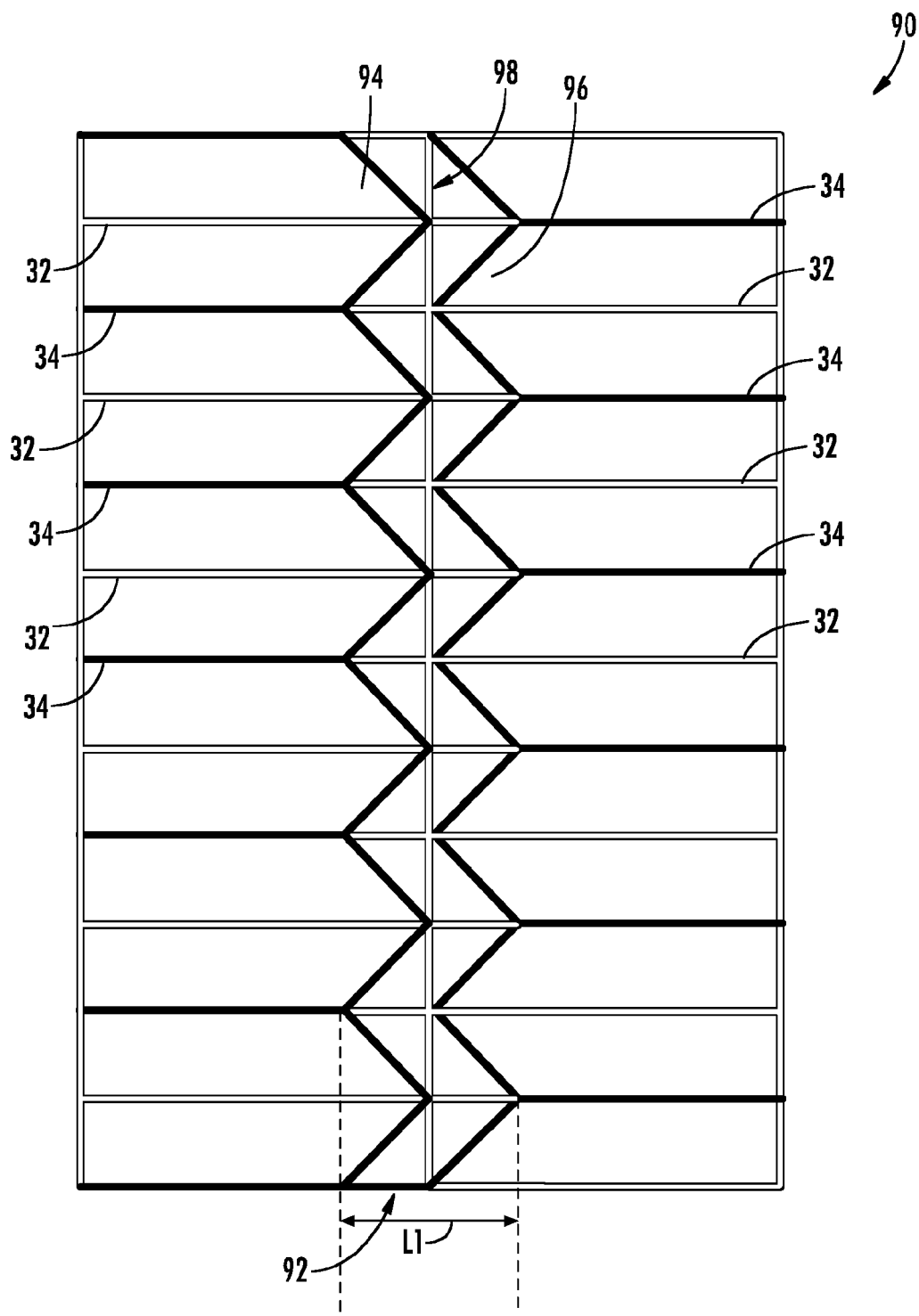
FIG. 16 is top plan view of a section of an armor layer showing one of the armor layer channels, according to another exemplary embodiment.

Referring to FIG. 16, a reinforcement layer, such as armor layer 90, is shown according to an exemplary embodiment. Armor layer 90 is substantially the same as armor layer 70, except for the differences discussed herein. Armor layer 90 includes longitudinal channels 92 that receive strength rods 36. Similar to armor 70, peaks 32 of armor layer 90 include peak sections 94 and 96 that extend at least a portion of the distance in the circumferential direction into channels 92. Unlike armor 70, the circumferential length of peak sections 94 and 96 are less than half of the channel circumferential length L1 of channel 92.

In this arrangement, channel 92 includes a longitudinally extending contiguous, planar or curved surface 98 that extends lengthwise along armor 90 similar to channel 40 discussed above. In this arrangement, peak sections 94 taper to points 100 that terminate to the left of the center line of channel 92 (in the orientation of FIG. 16), and peak sections 96 taper to points 102 that terminate to the right of the center line of channel 92 (in the orientation of FIG. 16). In this arrangement, the taper of peak sections 94 and 96 may be steeper than that of peak sections 74 and 76 (at least for a given circumferential channel length L1) and channel 92 may be deeper than channel 72 because the bottom of channel 92 is defined by surface 98 rather than the alternating outer surface sections of peak sections 74 and 76 that define the bottom of channel 72.

In various embodiments, a method of forming an optical communication cable, such as cable 10, is provided. In such embodiments, the method includes the step of providing a plurality of optical transmission elements, such as optical fiber ribbons 18. The method includes the step of wrapping a metal sheet around the optical transmission elements. In such embodiments, the metal sheet has an outer surface and a longitudinal channel, such as channels 40, 72 or 92, formed in the outer surface of the metal sheet. The method includes the step of positioning an elongate strength member, such as strength rod 36, within the longitudinal channel of the metal sheet, and in particular embodiments, the elongate strength member extends the entire length of the longitudinal channel. The method includes the step of extruding a polymer cable body, such as cable jacket 12, around the metal sheet and around the elongate strength member after positioning the elongate strength member within the longitudinal channel of the metal sheet.

In specific embodiments, the method includes the step of forming a series of alternating circumferential peaks and circumferential troughs in the metal sheet such that the circumferential peaks and troughs extend at least a portion of a distance across a width of the metal sheet. In specific embodiments, the method includes the step of forming the longitudinal channel in the metal sheet such that the longitudinal channel extends along a length of the metal sheet and extends in a length direction across at least ten of the circumferential peaks and at least ten of the troughs of the metal sheet. In specific embodiments, the steps of forming the series of alternating circumferential peaks and circumferential troughs in the metal sheet and of forming the longitudinal channel in the metal sheet occur before the wrapping of the metal sheet around the optical transmission elements.

In various embodiments, cable jacket 12 may be a variety of materials used in cable manufacturing, such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc. In various embodiments, buffer tube 24 is formed from one or more polymer material including polypropylene (PP), polybutylene terephthalate (PBT), polycarbonate (PC), polyamide (PA), polyoxymethylene (POM), poly(ethene-co-tetrafluoroethene) (ETFE), etc.

While the specific cable embodiments discussed herein and shown in the figures relate primarily to cables and core elements that have a substantially circular cross-sectional shape defining substantially cylindrical internal bores, in other embodiments, the cables and core elements discussed herein may have any number of cross-section shapes. For example, in various embodiments, cable jacket 12, central bore 16 and/or strength rods 36 may have an oval, elliptical, square, rectangular, triangular, hexagonal or other cross-sectional shape.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising: a cable body formed from a polymer material, the cable body defining a longitudinal direction and a length of the cable; a plurality of optical transmission elements surrounded by the cable body; a reinforcement layer surrounding the plurality of optical transmission elements and located between the cable body and the plurality of optical transmission elements, the reinforcement layer including an outer surface and a channel defined in the outer surface that extends in the longitudinal direction along at least a portion of the length of the cable; and an elongate strength element extending in the longitudinal direction within the channel; and
    wherein, at a plurality of cross-sections taken perpendicular to the length of the cable, the outer surface of the reinforcement layer has a maximum outer radius at a position outside of the channel, wherein the outer surface of the reinforcement layer has a channel radius at a radial innermost position within the channel, wherein the channel has a maximum channel depth that is the difference between the maximum outer radius and the channel radius, wherein the elongate strength element has a strength element width, wherein the maximum channel depth is at least 25% of the strength element width.

2. The optical communication cable of claim 1, wherein the reinforcement layer includes a series of alternating circumferential peaks and circumferential troughs, the circumferential peaks and troughs extend at least a portion of the distance around the plurality of optical transmission elements in the circumferential direction, wherein the channel of the reinforcement layer extends in the longitudinal direction past at least two of the circumferential peaks and past at least two of the troughs of the reinforcement layer, wherein the reinforcement layer is formed from a material that is different than the polymer material of the cable body.

3. The optical communication cable of claim 2, wherein a radius of the reinforcement layer measured at the outer surface at a bottom of the channel along at least one 10 cm segment of the channel is less than all of the radiuses of the reinforcement layer measured at all of the circumferential peaks, outside of the channel, within the at least one 10 cm segment.

4. The optical communication cable of claim 2, wherein the circumferential peaks and troughs extend circumferentially across at least a portion of the channel, wherein outermost radiuses of the circumferential peaks within the channel are less than the outer radiuses of circumferential peaks outside of the channel.

5. The optical communication cable of claim 1, wherein the reinforcement layer is a corrugated sheet of metallic tape, wherein the elongate strength element is an elongate rod extending between first and second ends of the cable body, wherein the strength element width is a diameter.

6. The optical communication cable of claim 5, wherein the maximum channel depth is a channel depth located at a plurality of longitudinal cross-sectional positions taken through circumferential peaks of the corrugated metallic tape.

7. The optical communication cable of claim 1, wherein the channel is a first channel and the elongate strength element is a first elongate strength element, further comprising:
    a second channel defined in the outer surface of the reinforcement layer that extends in the longitudinal direction at least a portion of the length of the cable, wherein the second channel is spaced at least 90 degrees in the circumferential direction from the first channel; and
    a second elongate strength element extending in the longitudinal direction within the second channel.

8. The optical communication cable of claim 7, wherein the first channel and the second channel extend the entire length of the cable, and the first and second elongate strength element are located within the first and second channels, respectively, along the entire length of the cable.

9. An optical communication cable comprising: a cable body, the cable body defining a central bore, a length extending between first and second ends of the cable body and an outer surface defining the outermost surface of the cable; at least one optical transmission element located in the central bore; an armor layer surrounding the at least one optical transmission element and located in the bore, the armor layer comprising: a plurality of circumferential peaks extending at least a portion of the distance around the at least one optical transmission element in the circumferential direction; and a plurality of circumferential troughs extending at least a portion of the distance around the at least one optical transmission element in the circumferential direction, wherein the circumferential peaks and troughs alternate in a longitudinal direction along the length of the cable; and an elongate strength element extending along the length of the cable along an outer surface of the armor layer, wherein at least a portion of the elongate strength element is recessed, in the radial direction, below an outermost surface of the plurality of circumferential peaks of the armor layer;

wherein, at a plurality of cross-sections taken perpendicular to the length of the cable, an outer surface of the elongate strength element is in contact with the outer surface of the armor layer, wherein the contact has an angular length around the perimeter of the elongate strength element of at least 5 degrees.

10. The optical communication cable of claim 9, wherein, at a cross-sectional positions of each of 10 adjacent circumferential peaks taken perpendicular to the length of the cable, the portion of the elongate strength element is recessed, in the radial direction, below the outermost surface of each of the 10 adjacent circumferential peaks.

11. The optical communication cable of claim 9, wherein, at a plurality of cross-sections taken perpendicular to the length of the cable, the armor layer surrounds at least a portion of a perimeter of the elongate strength element.

12. The optical communication cable of claim 9, wherein the elongate strength element is a first elongate strength element, the cable further comprising a second elongate strength element extending along the length of the cable along an outer surface of the armor layer, wherein at least a portion of the second elongate strength element is recessed, in the radial direction, below an outermost surface of the plurality of circumferential peaks of the armor layer, wherein the second elongate strength element is spaced at least 90 degrees in the circumferential direction from the first elongate strength element.

13. The optical communication cable of claim 12, wherein first and second elongate strength elements extend the entire length of the cable and are unwrapped relative to the armor layer such that the lengths of the first and second elongate strength elements are substantially the same as the length of the cable.

14. The optical communication cable of claim 13, wherein the armor layer includes first and second longitudinal channels formed in the outer surface of the armor layer and extending the longitudinal length of the armor layer, wherein the channels are substantially parallel to each other and are recessed, in the radial direction, below all of the circumferential peaks along the length of the cable, wherein the first elongate strength element is located at least in part within the first longitudinal channel and the second elongate strength element is located at least in part within the second longitudinal channel.

15. The optical communication cable of claim 14, wherein the cable body is formed from an extrudable polymer material, the armor layer is formed from a corrugated metal tape and the at least one optical transmission element comprises a stack of optical fiber ribbons, each optical fiber ribbon including at least four optical fibers, and further comprising a polymer buffer tube located within the bore and located between the armor layer and the stack of optical fiber ribbons.

16. A method of forming an optical communication cable comprising: providing a plurality of optical transmission elements; wrapping a metal sheet around the optical transmission elements, the metal sheet having an outer surface and a longitudinal channel formed in the outer surface of the metal sheet; positioning an elongate strength member within the longitudinal channel of the metal sheet, the elongate strength member extending the entire length of the longitudinal channel; and extruding a polymer cable body around the metal sheet and around the elongate strength member after positioning the elongate strength member within the longitudinal channel of the metal sheet;

wherein, at a plurality of cross-sections taken perpendicular to the length of the cable, an outer surface of the elongate strength element is in contact with the outer surface of the armor layer, wherein the contact has an angular length around the perimeter of the elongate strength element of at least 5 degrees, wherein, at a plurality of cross-sections taken perpendicular to the length of the cable, an outer surface of the elongate strength element is in contact with the outer surface of the armor layer, wherein the contact has an angular length around the perimeter of the elongate strength element of at least 5 degrees.

17. The method of claim 16, further comprising:

forming a series of alternating circumferential peaks and circumferential troughs in the metal sheet, wherein the circumferential peaks and troughs extend at least a portion of a distance across a width of the metal sheet; and forming the longitudinal channel in the metal sheet such that the longitudinal channel extends along a length of the metal sheet across at least ten of the circumferential peaks and at least ten of the troughs of the metal sheet.

18. The method of claim 17, wherein steps of forming the series of alternating circumferential peaks and circumferential troughs in the metal sheet and of forming the longitudinal channel in the metal sheet occur before the wrapping of the metal sheet around the optical transmission elements.

* * * * *